Patented Nov. 6, 1934

1,979,499

UNITED STATES PATENT OFFICE 1,979,499

VULCANIZATION OF CAOUTCHOUC

Allon Skipsey, St. Albans, England

No Drawing. Application August 23, 1933, Serial No. 686,370. In Great Britain September 8, 1932

14 Claims. (Cl. 18—53)

This invention relates to the vulcanization of rubber by the use of the sulphides of phosphorus as vulcanizing agents, such process being described and claimed broadly in prior Patent Specification No. 1,653,821.

The object of the invention is to provide improvements in the said process, one of which considerably increases the activity of the vulcanizing agents, and another of which retards the action of the vulcanizing agents. The products obtained according to these improvements are accordingly better vulcanized products, and the manipulation on the rolls of the mixes in which they are used is greatly facilitated.

According to one feature of the invention, the improved process includes the use as a vulcanizing agent of a combination of a phosphorus sulphide, a base and free sulphur, with or without the addition of an oil as a vehicle. These ingredients are preferably made into a paste, which by grinding is rendered smooth and easy to incorporate into the rubber. Any of the sulphides of phosphorus may be used in the making of the vulcanizing reagent, but the sesquisulphide ($P_4S_3$) is preferred. Further, the base selected may be an organic one, but is preferably an inorganic alkaline base, and the oil when added will usually be a mineral oil, although sperm oil, rosin oil, and certain other oils may be adopted.

According to another feature of the invention, the improved process includes the use as a retarder of vulcanization by sulphides of phosphorus of certain polyhydroxy bodies e. g., glycerine, starch, and the like, or of compounds containing these, such as the product known as ester gum, which is a compound of glycerine and colophony or like resin. Other retarders which may be used according to this invention are organic bases, aldehyde amine condensation products, pine tar, creosote or lycopodium. In all cases the vulcanized product may be subjected to an after-treatment with ammonia.

In one example of carrying out the first part of the invention, a vulcanizing reagent is prepared by mixing together the following ingredients, the proportions being by weight:—

| | Percent |
|---|---|
| Phosphorus sesquisulphide | 28 |
| Light calcined magnesia (MgO) | 2 |
| Mineral oil | 30 |
| Sulphur | 40 |

In preparing this reagent, the MgO is first dispersed in the oil, the sesquisulphide then added and well mixed, and the sulphur then incorporated and well mixed. The mixture is placed in a covered vessel and heated to a moderate temperature 80° C. or a somewhat higher temperature is suitable, for about ½ hour or longer. After cooling, the resultant porous mass is reground to a paste. If preferred, all or part of the base may be incorporated during the final grinding. It may be added, for example, to the rubber mix to be vulcanized, in the proportion of 6 parts of paste to 100 parts of rubber, or in a greater or less proportion. In another example it may be added in the proportion of 7 parts of paste to 100 parts of smoked rubber sheet mixed with 100 parts of ordinary fillers. In a further example 5 parts of paste may be added to a mixture comprising 100 parts pale crêpe rubber, 100 parts of wood meal, 100 parts of china clay and 3 parts of ester gum.

The improved reagent can be used satisfactorily in the vulcanization of both rubber, and normal rubber compounds, and other rubber compounds containing such ingredients as waste rubber, reclaimed rubber, ground cork waste, leather waste and the like.

The following are examples of quantities of ingredients in the reagent needed to give good vulcanization when added to 100 parts of pale crêpe rubber, and left to vulcanize at room temperature, or heated to 120° C. for 15 minutes.

*Example 1.*—Where ingredients are ground dry and added to rubber separately:—

| | Parts |
|---|---|
| Phosphorus sulphide | 3 |
| Sulphur | 5 |
| MgO or CaO | ½ |

*Example 2.*—When ingredients are mixed and ground in oil as described:—

| | |
|---|---|
| Phosphorus sulphide | 2.24 |
| Sulphur | 3.20 |
| MgO | 0.16 |
| Oil | 2.4 |

*Example 3.*—When mixture in oil is heated and reground:—

| | |
|---|---|
| Phosphorus sulphide | 1.68 |
| Sulphur | 2.40 |
| MgO | 0.12 |
| Oil | 1.80 |

One of the difficulties in using the sulphides of phosphorus for vulcanization, is due to their activity, the vulcanization being sometimes too rapid to allow of convenient manipulation of the mix. This difficulty is not avoided by the lessening of the amount of reagent used, though it may be overcome to a certain extent by the use of softening agents, such as oils, and waxes. The said difficulty, however, is entirely removed by the carrying out of the second part of this invention.

In one example of carrying out the second part of the invention, the vulcanization is retarded by the addition to the mix of from 1% to 2% of ester gum for ordinary purposes. The ester gum may be used in other proportions and either by itself or melted in oils or waxes. By the use of suitable proportions, vulcanization may be retarded sufficiently to allow any convenient time for manipulation of the mix and production of the final product.

The effect of the improved reagent is accelerated by heat.

What I claim is:—

1. The process of vulcanizing rubber and rubber compounds in which a vulcanizing agent is used consisting of a combination of a phosphorus sulphide, a base and free sulphur, with or without the addition of oil as a vehicle.

2. The process of vulcanizing rubber and rubber compounds in which a vulcanizing agent is used consisting of a previously prepared combination of a phosphorus sulphide, a base and free sulphur, with or without the addition of oil as a vehicle.

3. The process claimed in claim 1 including the further step of adding a retarder selected from the group "polyhydroxy bodies (such as glycerine and starch) compounds containing them (such as ester gum) organic bases, aldehyde condensation products, pine tar and lycopodium."

4. The process claimed in claim 1, wherein the vulcanized product is subjected to an after-treatment with ammonia.

5. The process claimed in claim 1, in which the phosphorus sulphide used is the sesquisulphide $P_4S_3$.

6. A vulcanizing agent for use in the vulcanization of rubber and rubber compounds consisting of or comprising a combination of a phosphorus sulphide, a base and free sulphur, with or without the addition of oil as a vehicle.

7. A vulcanizing agent as claimed in claim 1 wherein the base used is an inorganic alkaline base and the phosphorus sulphide used is the sesquisulphide $P_4S_3$.

8. A vulcanizing agent as claimed in claim 6 prepared by dispersing 2% of light calcined magnesia (MgO) in 30% of mineral oil, adding and mixing 28% phosphorus sesquisulphide and then adding and mixing 40% of sulphur, the mixture being heated in a covered vessel to a temperature of about 80° C. and after cooling being reground to a paste.

9. A vulcanizing agent as claimed in claim 6, modified in that some or all the base is incorporated during the final grinding.

10. The process of vulcanizing rubber using a vulcanizing agent as claimed in claim 6, wherein 6 parts of the agent are used for every 100 parts of rubber.

11. The process claimed in claim 1, wherein the three ingredients of the vulcanizing agent are ground dry and added to the rubber or rubber compound separately.

12. The process claimed in claim 1 in which ester gum is used as a retarder in the proportion of 1% to 2%, either alone or melted in oil or waxes.

13. A vulcanizing agent as claimed in claim 6, in which the phosphorus sulphide, base and free sulphur are mixed in the proportions and in the manner set out in the examples herein described.

14. Rubber goods vulcanized by the process claimed in claim 1.

ALLON SKIPSEY.